United States Patent
Hung et al.

(10) Patent No.: US 8,022,940 B2
(45) Date of Patent: Sep. 20, 2011

(54) CAPACITIVE TOUCH SYSTEM AND DATA TRANSMISSION METHOD IN A CAPACITIVE TOUCH SYSTEM

(75) Inventors: Tse-Lun Hung, Taipei (TW); Jung-Shou Huang, Taichung County (TW); Chang-Hsin Chen, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 354 days.

(21) Appl. No.: 12/385,094

(22) Filed: Mar. 31, 2009

(65) Prior Publication Data
US 2009/0251428 A1 Oct. 8, 2009

(30) Foreign Application Priority Data
Apr. 2, 2008 (TW) ................................ 97112061 A

(51) Int. Cl.
*G06F 3/041* (2006.01)
(52) U.S. Cl. ...................... 345/173; 345/174; 178/18.06
(58) Field of Classification Search .......... 345/173–175; 178/18.01–19.03
See application file for complete search history.

(56) References Cited

U.S. PATENT DOCUMENTS

| | | | | |
|---|---|---|---|---|
| 6,259,437 B1 * | 7/2001 | Onodaka et al. | ............... | 345/174 |
| 7,848,825 B2 * | 12/2010 | Wilson et al. | ...................... | 700/3 |
| 7,876,311 B2 * | 1/2011 | Krah et al. | ..................... | 345/173 |
| 2005/0146511 A1 * | 7/2005 | Hill et al. | ....................... | 345/173 |
| 2007/0257890 A1 * | 11/2007 | Hotelling et al. | ............. | 345/173 |
| 2008/0048997 A1 * | 2/2008 | Gillespie et al. | ............... | 345/174 |
| 2008/0158167 A1 * | 7/2008 | Hotelling et al. | ............. | 345/173 |
| 2008/0158175 A1 * | 7/2008 | Hotelling et al. | ............. | 345/173 |
| 2008/0162997 A1 * | 7/2008 | Vu et al. | .......................... | 714/27 |

* cited by examiner

*Primary Examiner* — Richard Hjerpe
*Assistant Examiner* — Christopher Thompson
(74) *Attorney, Agent, or Firm* — Rosenberg, Klein & Lee

(57) ABSTRACT

A capacitive touch system uses at least two integrated circuits to simultaneously scan a touch panel, each scanning only a portion of traces of the touch panel, and a second integrated circuit to receive sensed data from the first integrated circuits. The sensed data contains parameters representing a sum of the sensed values of all traces in a direction that one of the first integrated circuits is in charge of scanning, a sum of products obtained by multiplying the sensed value of each trace in the direction that the one of the first integrated circuits scans by the order number of that trace, a number of fingers in the direction detected by the one of the first integrated circuits, and whether or not the sensed values of the first and last traces in the direction that the one of the first integrated circuits scans are zero.

6 Claims, 5 Drawing Sheets

CAPACITIVE TOUCH SYSTEM AND DATA TRANSMISSION METHOD IN A CAPACITIVE TOUCH SYSTEM

FIELD OF THE INVENTION

The present invention is related generally to a capacitive touch system and, more particularly, to a data transmission method in a capacitive touch system.

BACKGROUND OF THE INVENTION

In conventional applications, all the large scale capacitive touch panels use a surface capacitance sensing technique to scan thereto for determining a touch information, which uses a set of sensing currents, each directed to an endpoint of the large scale touch panel to produce sensed values, and therefore, even multiple fingers simultaneously touch the large scale touch panel, this sensing technique still retrieves only one set of sensed currents in response to this multi-finger touch. For this reason, the surface capacitance sensing technique can identify only one set of absolute coordinates. In a two dimensional matrix for instance, only one set of parameters (X,Y) will be determined, and thereby it can't implement a multi-finger touch detection.

An all points addressable (APA) projected capacitance sensing technique is capable of implementing a multi-finger touch detection, but not applicable to large scale touch panels because, to implement this sensing technique, it is necessary to charge and discharge each point sensor on the large scale touch panel. Taking a matrix-type touch panel for example, when the X and Y traces increase, the pixel number of an APA projected capacitance touch panel dramatically increases and thereby significantly degrades the frame rate of the touch panel due to the very long time period for scanning the large scale touch panel in a frame.

An axis intersect (AI) projected capacitance sensing technique is also capable of implementing a multi-finger touch detection, but not applicable to large scale touch panels, too. FIG. 1 is a schematic diagram of a conventional AI projected capacitance sensing technique applied to a small scale touch panel 10, in which an AI projected capacitance touch IC 12 is used to scan the small scale touch panel 10. Assuming that the AI projected capacitance touch IC 12 can support up to 22 traces, a good frame rate can be attained for a small scale touch panel 10 having ten X traces TRX1-TRX10 and ten Y traces TRY1-TRY10. However, if a this type touch IC 12 is applied to a large scale touch panel 14 having forty X traces TRX1-TRX40 and forty Y traces TRY1-TRY40, as shown in FIG. 2, the total number of traces that the touch IC 12 needs to scan dramatically increases. Unfortunately, the frame rate of the overall touch panel application is dependent to a very large extent on the time it takes the touch IC 12 to charge and discharge capacitors each time. In other words, the frame rate is determined mainly by the time in a frame that the touch IC 12 charges and discharges the capacitors. Hence, if an AI projected capacitance touch IC capable of scanning a greater number of traces is applied to a large scale touch panel 14, a major drawback would be a significantly decreased frame rate in the overall application, which leads to compromised performance at the application end.

SUMMARY OF THE INVENTION

An object of the present invention is to provide a capacitive touch system and a data transmission method in a capacitive touch system.

According to the present invention, a capacitive touch system includes a touch panel having a plurality of traces, at least two first integrated circuits and a second integrated circuit. Each of the first integrated circuits scans only a respective portion of the traces, and the second integrated circuit receives sensed data from the first integrated circuits for computation. In a data transmission method, each of the first integrated circuits sends parameters representing a sum of the sensed values of all traces in a direction that this first integrated circuit is in charge of scanning, a sum of products obtained by multiplying the sensed value of each of the traces in the direction that this first integrated circuit scans by the order number of that trace, a number of fingers in the direction detected by this first integrated circuit, whether or not the sensed value of the first trace in the direction that this first integrated circuit is in charge of scanning is zero, and whether or not the sensed value of the last trace in the direction that this first integrated circuit is in charge of scanning is zero.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
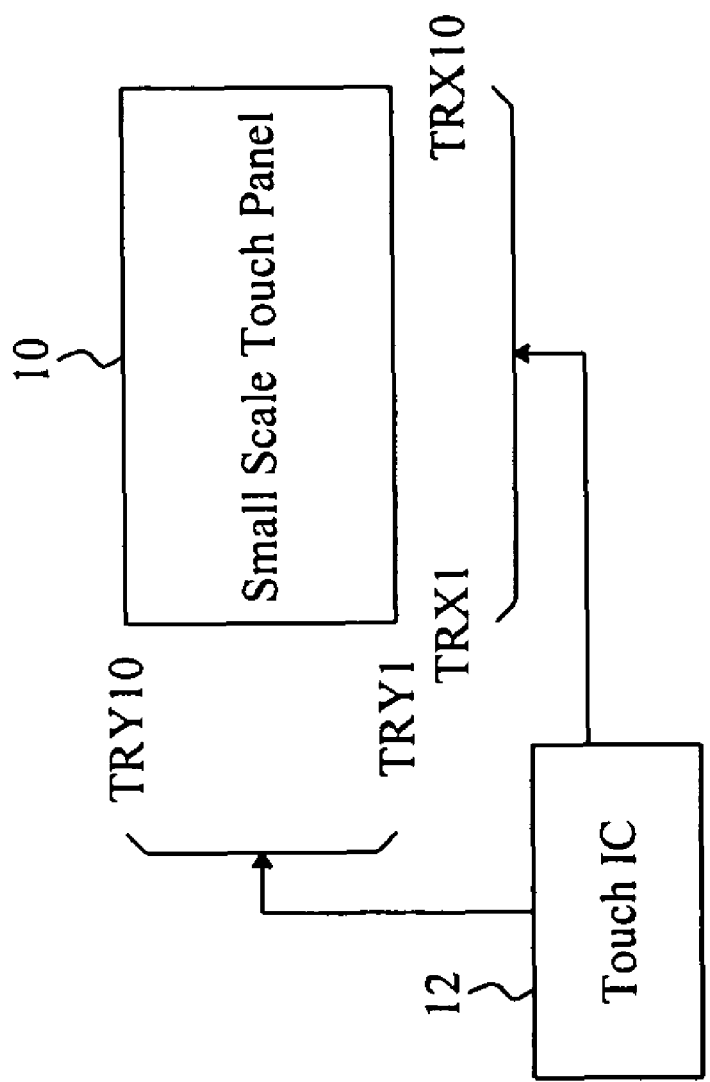
FIG. 1 is a schematic diagram of a conventional AI projected capacitance sensing technique applied to a small scale touch panel.
Figure 2:
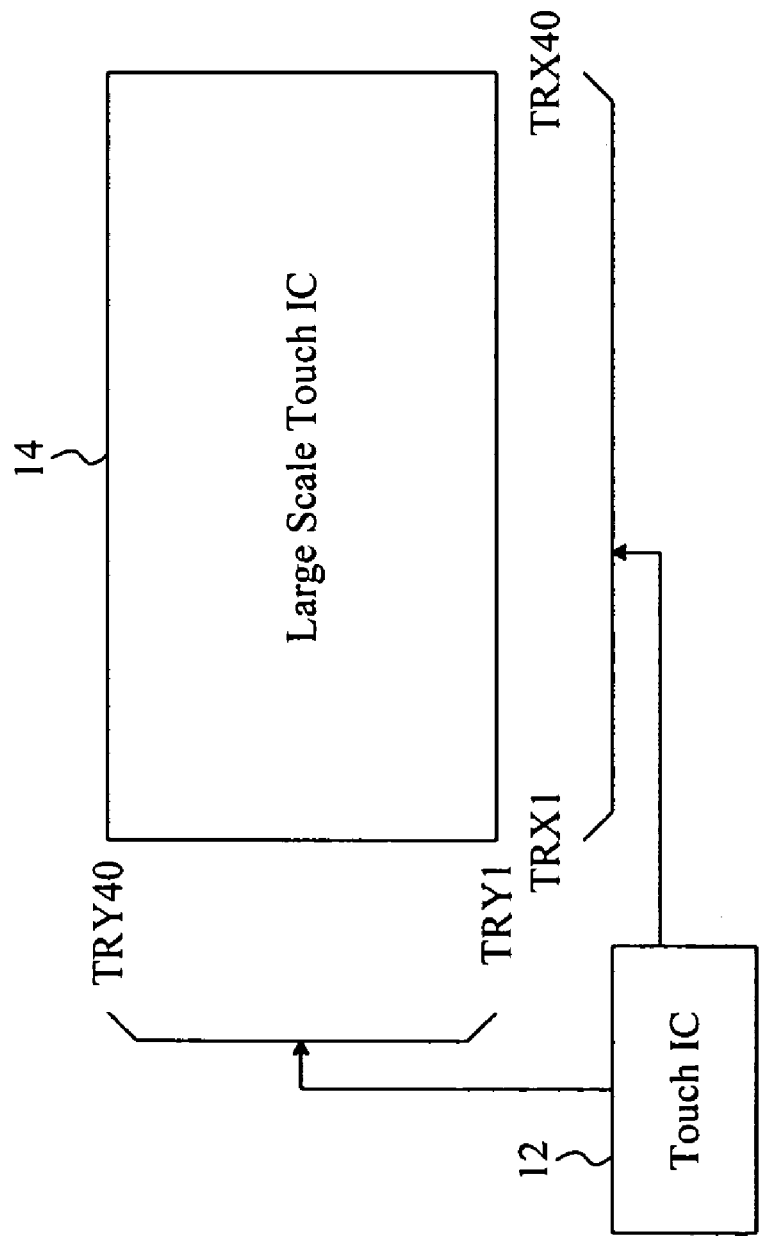
FIG. 2 is a schematic diagram of a conventional AI projected capacitance sensing technique applied to a large scale touch panel.
Figure 3:
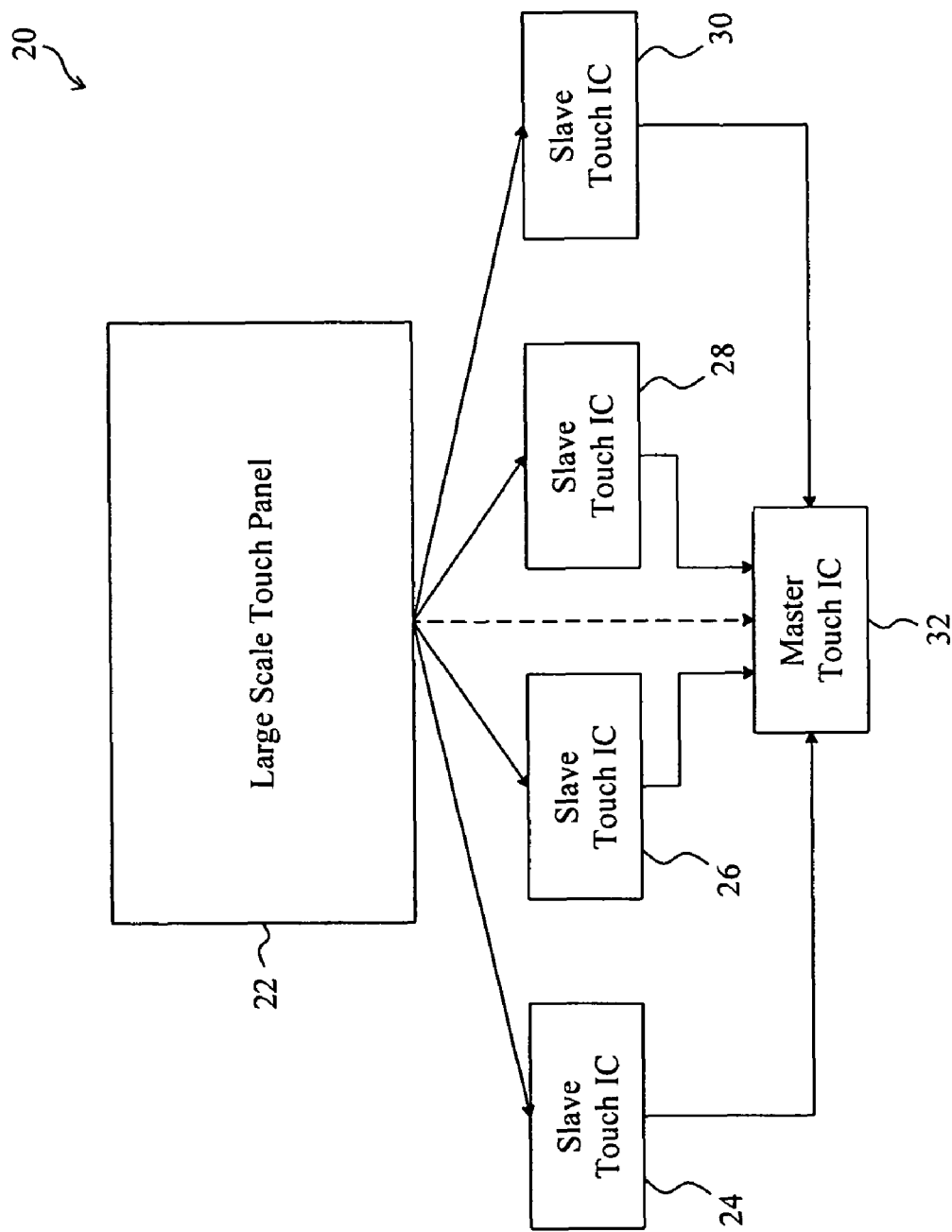
FIG. 3 is a schematic diagram of a capacitive touch system using at least two AI projected capacitance touch ICs to scan a touch panel.

According to the present invention, as shown in FIG. 3, a capacitive touch system 20 uses four AI projected capacitance touch ICs 24, 26, 28 and 30 to simultaneously scan a large scale touch panel 22 to increase the frame rate of the capacitive touch system 20. Assuming that the large scale touch panel 22 has eighty traces, for example, given the order numbers of 1-80, each of the touch ICs 24-30 is responsible for scanning respective twenty traces. Each of the touch ICs 24-30 is a slave touch IC, scans the traces in one or more directions, and transmits its sensed values to a master touch IC 32 where the received sensed values are used for final and overall calculation, and subsequent actions may be determined for intended applications. The master touch IC 32 is also responsible for coordinating the overall operation of the capacitive touch system 20 and external communications. If needed, the master touch IC 32 may also take part in scanning, as indicated by the dashed line in FIG. 3. Alternatively, the slave touch ICs 24-30 may share some calculation to reduce the loading of the master touch IC 32.

Figure 4:
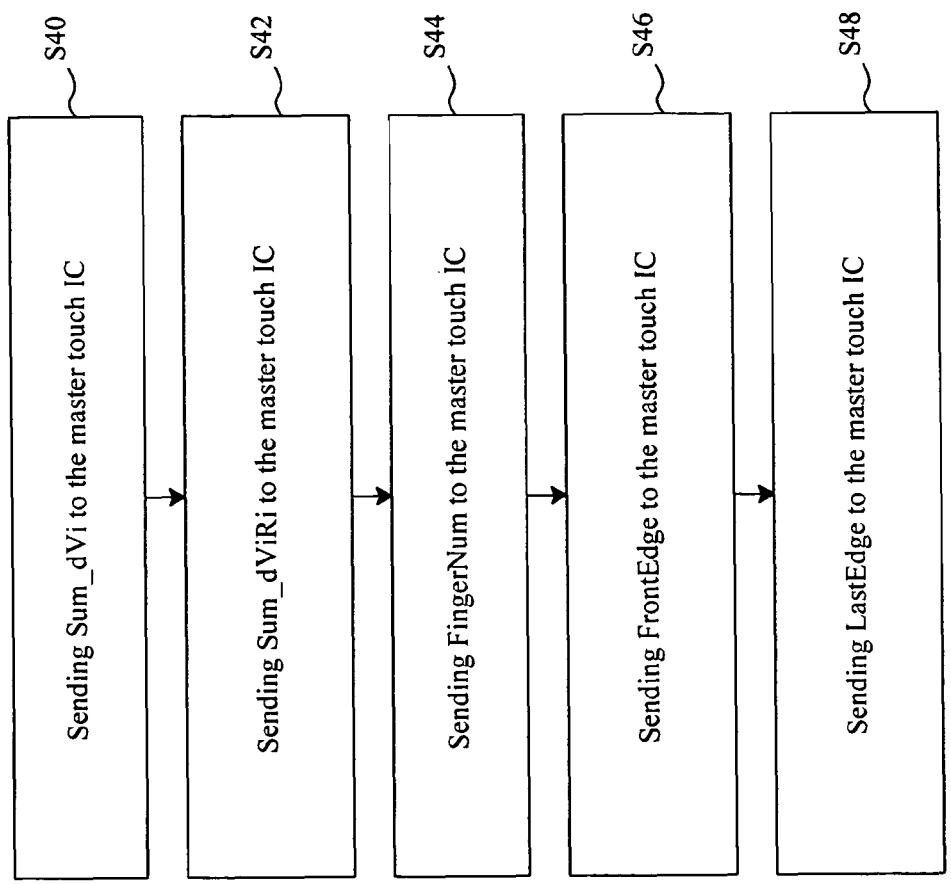
FIG. 4 is a diagram showing a flowchart of the data transmission from a slave touch IC to a master touch IC according to the present invention.

FIG. 4 is a diagram showing a flowchart of the data transmission from the slave touch ICs 24-30 to the master touch IC 32. For the slave touch IC 24 to transmit its sensed data to the master touch IC 32, it sends a parameter Sum_dVi to the master touch IC 32 in step S40, where Sum_dVi is a sum of the sensed values of all traces in a direction that the slave touch IC 24 is in charge of scanning, and a parameter Sum_dViRi to the master touch IC 32 in step S42, where Sum_dViRi is a sum of the products obtained by multiplying the sensed value of each of the traces in the direction that the slave touch IC 24 scans by the order number of that trace. For example, assuming that the slave touch IC 24 scans the X traces with the order numbers of 1, 2 and 3, and these X traces have the sensed values of dV_1, dV_2 and dV_3, respectively, the slave touch IC 24 will send Sum_dViRi=dV_1×1+ dV_2×2+dV_3×3 to the master touch IC 32. The slave touch IC 24 further sends a parameter FingerNum to the master touch IC 32 in step S44, where FingerNum represents the number of fingers detected by the slave touch IC 24 in the direction, a parameter FrontEdge to the master touch IC 32 in step S46, where FrontEdge indicates whether or not the sensed value of the first trace in the direction that the slave touch IC 24 is in charge of scanning is zero, and a parameter LastEdge to the master touch IC 32 in step S48, where LastEdge indicates whether or not the sensed value of the last trace in the direction that the slave touch IC 24 is in charge of scanning is zero.

Figure 5:
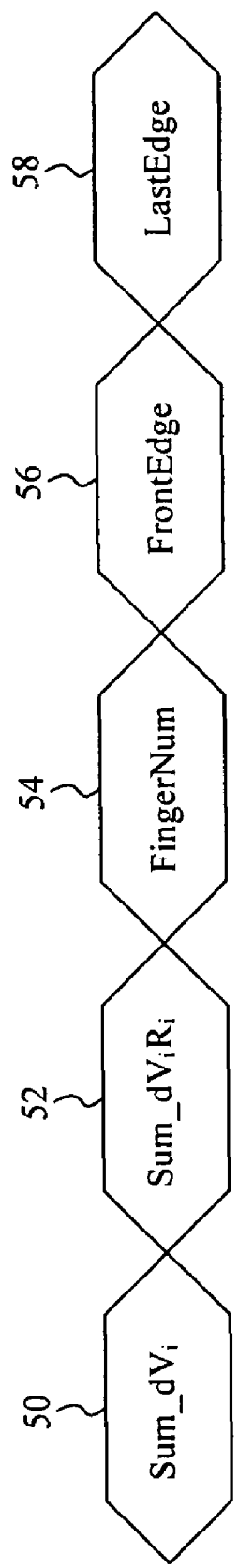
FIG. 5 is a diagram showing a data structure for a data transmission method in a capacitive touch system according to the present invention.

FIG. 5 is a diagram showing a data structure for the data transmission of FIG. 4, which includes a field 50 for storing the parameter Sum_dVi to notify the master touch IC 32 of the sum of the sensed values of all traces in the direction that the slave touch IC 24 is in charge of scanning, a field 52 for storing the parameter Sum_dViRi to notify the master touch IC 32 of the sum of the products obtained by multiplying the sensed value of each of the traces in the direction that the slave touch IC 24 scans by the order number of that trace, a field 54 for storing the parameter FingerNum to notify the master touch IC 32 of the number of fingers detected by the slave touch IC 24 in the direction, a field 56 for storing the parameter FrontEdge to notify the master touch IC 32 whether or not the sensed value of the first trace in the direction that the slave touch IC 24 is in charge of scanning is zero, and a field 58 for storing the parameter LastEdge to notify the master touch IC 32 whether or not the sensed value of the last trace in the direction that the slave touch IC 24 is in charge of scanning is zero.

All the other slave touch ICs 26-30 operate in the same way as described above. This data transmission method allows rapid data transmission from the slave touch ICs to the master touch IC in applications where the sensed values or the relation between the sensed values of consecutive frames are not for further use.

The master touch IC 32 accumulates the Sum_dVi and Sum_dViRi sent from the slave touch ICs 24-30 respectively, to obtain parameters $$\text{Sum\_dV} = \sum_{i=1}^{N} \text{Sum\_dV}_i \quad [\text{EQ-1}]$$

and $$\text{Sum\_dVR} = \sum_{i=1}^{N} (\text{Offset}_i + \text{Sum\_dV}_i R_i) \quad [\text{EQ-2}]$$

where N is the total number of the slave touch ICs, and $\text{Offset}_i$ is an offset for the order number of the first trace that the i-th slave touch IC has to consider. The master touch IC 32 could divide Sum_dVR by Sum_dV to determine the central point of the touched fingers in the direction. Since FingerNum indicates the number of fingers detected by a particular slave touch IC in the direction it is in charge of, the sensed value of the first trace scanned by a particular slave touch IC will not be zero if FrontEdge is a specific value, and the sensed value of the last trace scanned by a particular slave touch IC will not be zero if LastEdge is a specific value, the master touch IC 32 could determine the central point and the number of the fingers detected in the direction with those parameters provided by the slave touch ICs 24-30.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A data transmission method in a capacitive touch system including at least two first integrated circuits to simultaneously scan a touch panel and a second integrated circuit to receive sensed data from the first integrated circuits, the data transmission method comprising:

selecting one of the first integrated circuits to send five parameters therefrom to the second integrated circuit;

wherein the first parameter represents a sum of the sensed data of all traces in a direction that the selected first integrated circuit is in charge of scanning, the second parameter represents a sum of products obtained by multiplying the sensed data of each trace in the direction that the selected first integrated circuit scans by the order number of that trace, the third parameter represents a number of fingers in the direction detected by the selected first integrated circuit, the fourth parameter indicates whether or not the sensed value of the first trace in the direction that the selected first integrated circuit is in charge of scanning is zero, and the fifth parameter indicates whether or not the sensed value of the last trace in the direction that the selected first integrated circuit is in charge of scanning is zero.

2. A capacitive touch system, comprising:

a touch panel having a plurality of traces;

at least two first integrated circuits to simultaneously scan the touch panel, each scanning only a portion of the traces; and a second integrated circuit connected to the first integrated circuits, to receive sensed data therefrom;

wherein one of the first integrated circuits sends to the second integrated circuit a sensed data packaged with a data structure including:

a first field for notifying the second integrated circuit a sum of the sensed data of all traces in a direction that the one of the first integrated circuits is in charge of scanning;

a second field following the first field for notifying the second integrated circuit of a sum of products obtained by multiplying the sensed data of each trace in the direction that the one of the first integrated circuits by the order number of that trace;

a third field following the second field for notifying the second integrated circuit of a number of fingers in the direction detected by the one of the first integrated circuits;

a fourth field following the third field for notifying the second integrated circuit whether or not the sensed value of the first trace in the direction that the one of the first integrated circuits is in charge of scanning is zero; and a fifth field following the fourth field for notifying the second integrated circuit whether or not the sensed value of the last trace in the direction that the one of the first integrated circuits is in charge of scanning is zero.

3. The capacitive touch system of claim 2, wherein the second integrated circuit calculates with the received sensed data to determine the central point and the number of the fingers in the direction.

4. The capacitive touch system of claim 2, wherein the second integrated circuit coordinates the overall operation of the capacitive touch system.

5. The capacitive touch system of claim 2, wherein the second integrated circuit is responsible for external communications.

6. The capacitive touch system of claim 2, wherein each of the first integrated circuits comprises an axis intersect projected capacitance touch integrated circuit.

* * * * *